United States Patent
Tamminga

(12) 
(10) Patent No.: US 6,834,989 B2
(45) Date of Patent: Dec. 28, 2004

(54) VERTICAL MIXER WITH ONE OR MORE SIGHT WINDOWS

(76) Inventor: Jacob R. Tamminga, R.R. #2, Orton, Ontario (CA), L0N 1N0

( * ) Notice: Subject to any disclaimer, the term of this patent is extended or adjusted under 35 U.S.C. 154(b) by 0 days.

(21) Appl. No.: 10/621,340

(22) Filed: Jul. 18, 2003

(65) Prior Publication Data

US 2004/0017729 A1 Jan. 29, 2004

Related U.S. Application Data

(60) Provisional application No. 60/396,565, filed on Jul. 18, 2002.

(51) Int. Cl.[7] .................................................. B01F 7/24
(52) U.S. Cl. ........................ 366/143; 366/314; 366/605; 241/101.761
(58) Field of Search ................................. 366/143, 297, 366/305, 314, 318, 605; 241/101.761

(56) References Cited

U.S. PATENT DOCUMENTS

| | | | | |
|---|---|---|---|---|
| 3,346,240 A | * | 10/1967 | Lavelle et al. | 366/143 |
| 3,552,722 A | * | 1/1971 | Sutter | 366/143 |
| 3,749,370 A | * | 7/1973 | Clech et al. | 366/143 |
| 3,831,818 A | * | 8/1974 | Dumont | 366/143 |
| 4,049,244 A | * | 9/1977 | Hedrich | 366/143 |
| 5,549,384 A | * | 8/1996 | Reynolds | 366/143 |
| 5,647,665 A | * | 7/1997 | Schuler | 366/603 |

* cited by examiner

Primary Examiner—Tony G. Soohoo

(57) ABSTRACT

A vertical mixer has plexi-glass sight windows located in a side wall of the mixing chamber. The windows extend generally vertically between a top and bottom of the mixing chamber and provide visual access to an interior of the chamber from outside the mixer.

11 Claims, 3 Drawing Sheets

VERTICAL MIXER WITH ONE OR MORE SIGHT WINDOWS

This invention claims priority based on U.S. Provisional Application Ser. No. 60/396,565 filed Jul. 18, 2002 and incorporates all of said provisional application by reference.

BACKGROUND OF THE INVENTION

1. Field of the Invention

This invention relates to a vertical mixer having a mixing chamber with one or more sight windows extending vertically along a side wall of the mixing chamber. More particularly, this invention relates to a vertical feed mixer for mixing animal feed and, in particular, for use in mixing hay in any form, including round bales, with other animal feed where the mixer has one or more sight windows located in a side wall of the mixing chamber.

2. Description of the Prior Art

Vertical feed mixers of various forms are known and, in particular, vertical feed mixers for mixing round bales of hay or haylage of any size, including large and small bales with other animal feed stuffs including corn, silage, commodities, by-products and concentrates are known. It is further known to have vertical feed mixers with one or more augers that are rotatably mounted within a mixing chamber. The mixing chamber has an open top with an outlet door that can be moved between a closed position and an open position. The mixing chamber can have sloped side walls or vertical side walls.

Existing mixing chambers do not provide a view from an exterior side of the mixing chamber of a degree of mixing of the material being mixed. Vertical mixers are often used where one of the materials is broken down during the mixing process and where it is desirable not to over-mix the materials or to break down one or more of the materials to a greater degree than required. If over-mixing occurs, time and energy is wasted. Also, the material can become too fine to a degree where it is not as desirable for animal feed and becomes susceptible to greater losses through spillage or losses caused by windy conditions.

SUMMARY OF THE INVENTION

It is an object of the present invention to provide visual access from outside the mixing chamber to enable the degree of mixing within the chamber to be observed from a side of the mixer.

A vertical mixer has a mixing chamber containing a substantially vertical rotatable auger having a generally helical flight that is tapered to converge from bottom to top. There are power means to rotate the auger about a longitudinal centre axis. The chamber has at least one opening to receive and discharge materials to be mixed. The mixing chamber has a side wall with at least one window extending at least partially between a top and bottom of said side wall to allow visual access to an interior of the chamber from outside the mixer.

DETAILED DESCRIPTION OF A PREFERRED EMBODIMENT

Figure 1:
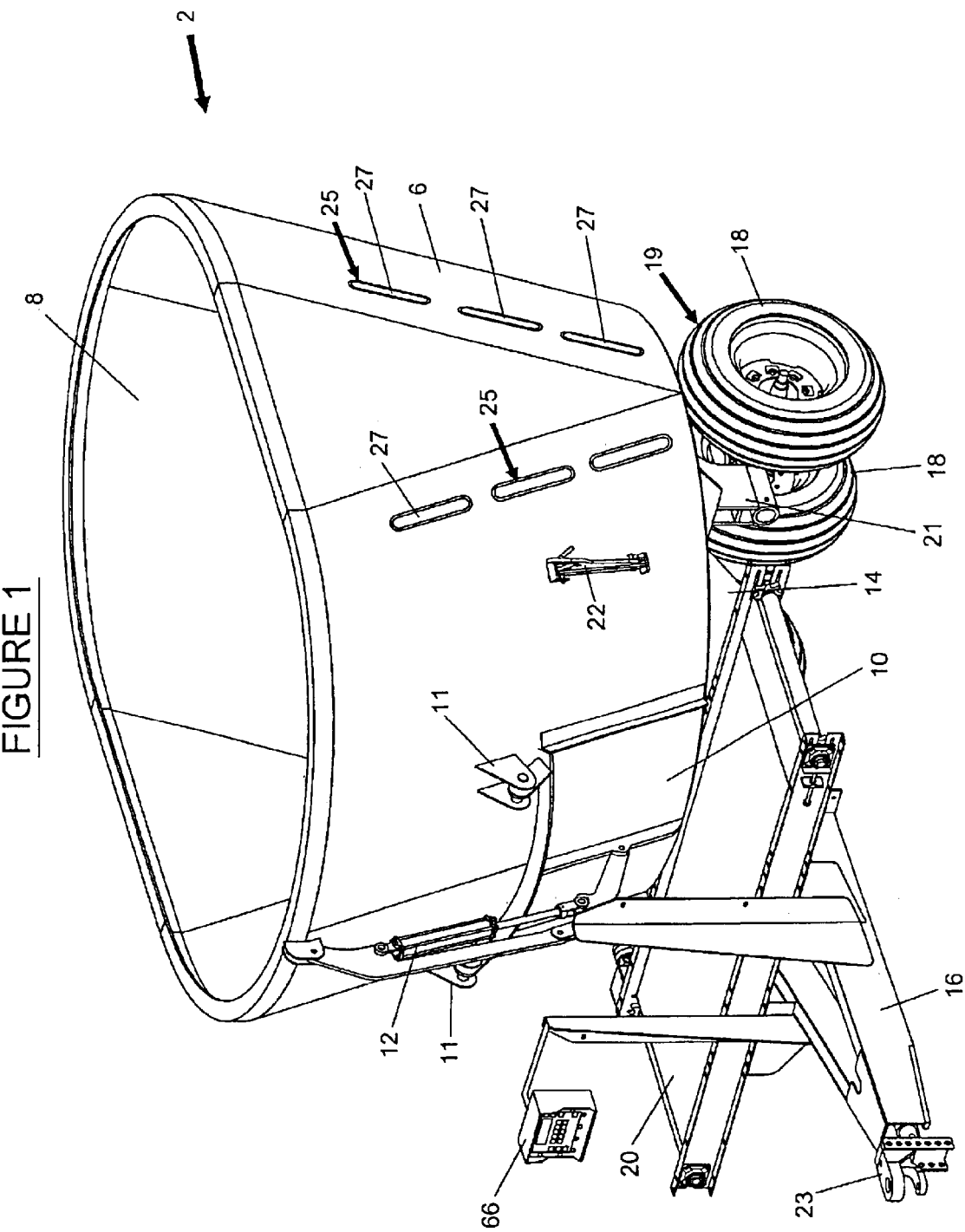
In FIG. 1, there is shown a vertical mixer with sight windows located in a mixing chamber.
Figure 2:
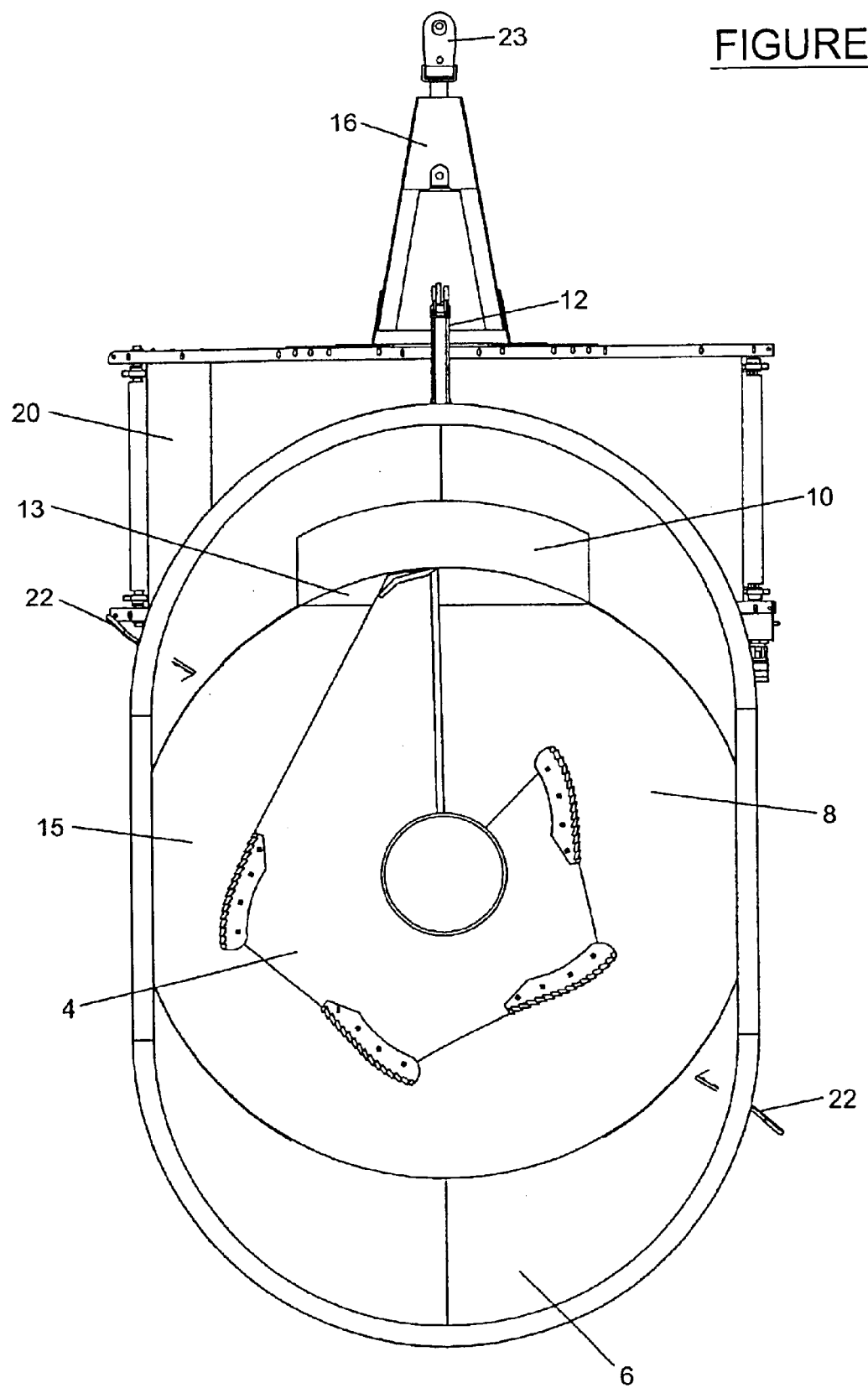
FIG. 2 is a top view of the mixer of FIG. 1.

In FIGS. 1 and 2, there is shown a mixer 2 having a single auger 4 with a tapered wall 6 of a mixing chamber 8. The tapered wall 6 converges from top to bottom. The chamber 8 has an open top and an outlet door 10 that is in a closed position. The door 10 is connected by hinges 11 and is operable between a closed position and an open position (not shown) by means of a hydraulic cylinder 12. The door can be designed to be opened and closed in various ways. The door has a segment 13 along a bottom thereof that forms part of a floor 15 of the mixing chamber 8 when the door is in the closed position. The mixer 2 has a frame 14 with a tongue 16 and wheels 18. There are two sets 19 of wheels 18 mounted on each side of the mixer 2 (only one set 19 being shown in FIG. 1) Each set 19 has two wheels 18. Each set 19 is affixed to the mixer by a bracket 21. A conveyer 20 is used to move mixed material that exits the door 10 away from the mixer 2. An adjustable baffle 22 located in the wall 6 assists in controlling the degree of cutting that occurs within the mixer. There are two baffles 22 shown in the mixer 2. The tongue 16 has a hitch 13 to connect the mixer to a tractor (not shown). There are two groups 25 of windows 27 extending between a top and bottom of the tapered wall 6. The two groups 25 are located laterally apart from one another.

The tapered wall 6 of the mig chamber 8 has two groups 26 of windows 28 extending between a top and bottom of said side wall. There are three windows 28 in each group. The location of the windows enables an operator of the mixer to view the degree of mixing within the mixing chamber from outside the mixer. For example, near the beginning of the mixing process, the lowermost window in each group will show the highest degree of mixing, the middle window will show a medium degree of mixing and the upper window will show the least degree of mixing. As the mixing process proceeds, the degree of mixing in the three windows of each group will become substantially uniform.

Figure 3:
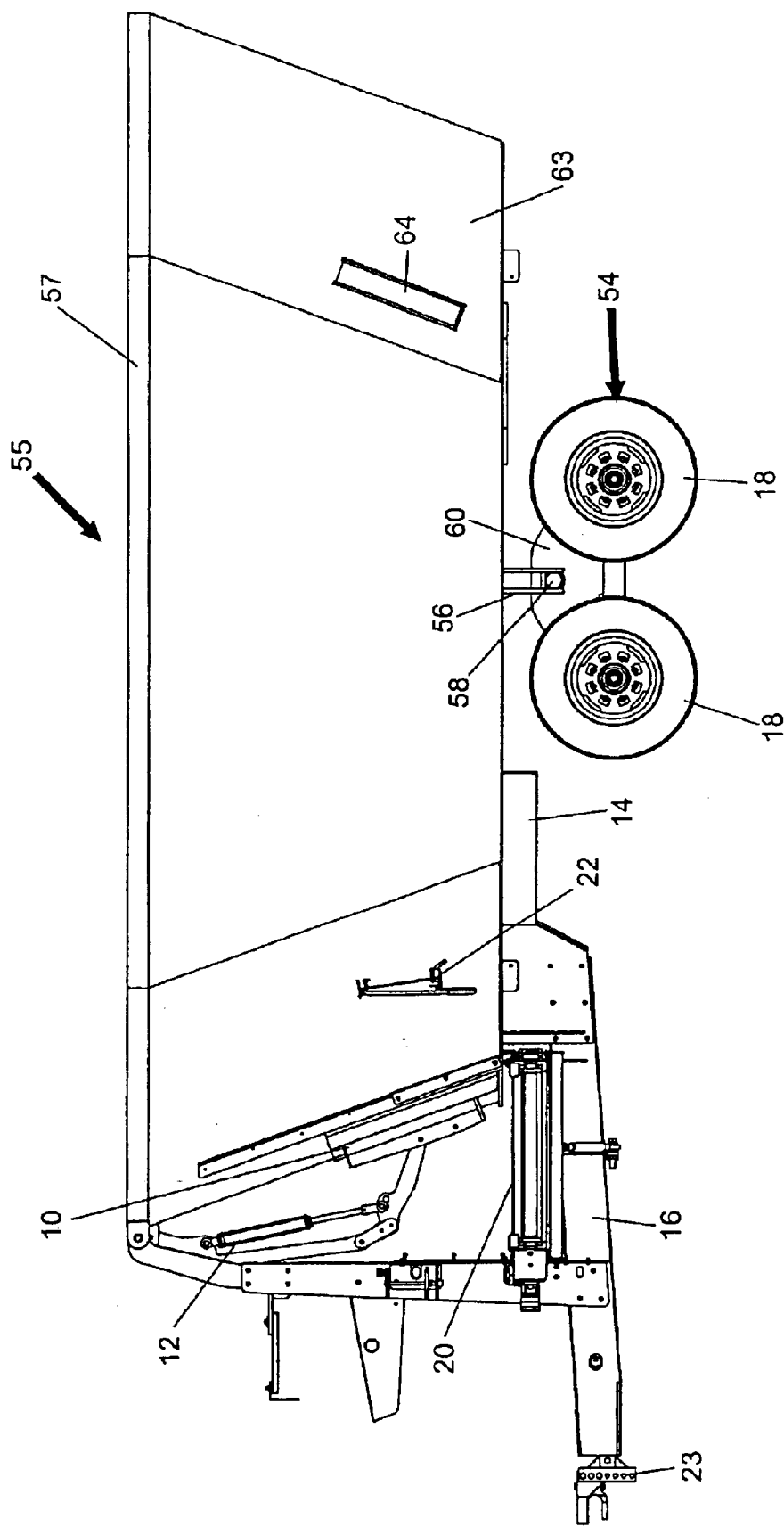
FIG. 3 is a side view of a double auger mixer having a window in a side wall.

In FIG. 3, the mixer 55 has a mixing chamber 57 with a sloped side wall 63. A window 64 in the side wall provides visual access to an interior of the mixing chamber 57 so that the degree of mixing can be observed from a side of the mixer. The mixer is supported by two sets 54 (only one of which is shown) of wheels 18. The wheels 18 are in a horizontal position. A support bracket 56 is affixed to an underside of the mixing chamber 57 and extends downward from either side of the mixer 55. A pivot bar 58 is supported by the two support brackets 56 (only one of which is shown). A pivot bracket 60 extends from front to rear in each of the sets 54 to allow the wheels of each set to pivot about the pivot point extending longitudinally through the pivot bar 58.

Preferably, the windows have an elongated shape and extend vertically between the top and bottom of the side wall of the mixing chamber. In FIG. 1, there are two groups of three windows each. In FIG. 3, there is one window. Preferably, there is more than one window. If one window were to be used extending between the top and bottom of the mixing chamber, the one window would reduce the structural integrity of the chamber. By using three windows, the strength of the chamber can be maintained more easily as the side wall extends between the windows which are spaced apart from one another.

While many materials are suitable for the window or windows they are preferably made of plexi-glass. Further, the window or windows is preferably located in the lower half of the side wall. The use of windows in the mixing chamber and, particularly, windows in the lower half of the chamber, allow an operator of the mixer to observe the degree of mixing. When the desired degree of mixing has been achieved, the mixing process can be stopped immediately, thereby saving valuable time and expense. When windows are not located in the lower part of the side wall, there is a tendency for an operation to over mix the materials in order to ensure that the desired degree of mixing has been attained or exceeded. The mixers are shown with adjustable wheel systems, but the invention can be used with a conventional wheel system.

I claim:

1. A vertical mixer comprising a mixing chamber containing a substantially vertical rotatable auger having a generally helical flight that is tapered to converge from bottom to top, a power means to rotate said auger about a longitudinal centre axis, said chamber having at least one opening to receive and discharge feed, said mixing chamber having a side wall with at least one window extending at least partially between a top and bottom of said side wall to allow visual access to an interior of said chamber from outside said mixer.

2. A vertical mixer as claimed in claim 1 wherein said at least one window is located in a bottom portion of said side wall.

3. A vertical mixer as claimed in claim 2 wherein said at least one window extends between a top and bottom of said side wall.

4. A vertical mixer as claimed in claim 1 wherein said at least one window is a plurality of windows.

5. A vertical mixer as claimed in claim 4 wherein said plurality of windows is three windows.

6. A vertical mixer as claimed in claim 1 wherein said at least one window has a longitudinal shape.

7. A vertical mixer as claimed in claim 1 wherein said at least one window is three windows.

8. A vertical mixer as claimed in claim 7 wherein said three windows extend linearly between said top and said bottom of said side wall.

9. A vertical mixer as claimed in any one of claims 1, 2 or 3 wherein said at least one window is made from plexi-glass.

10. A vertical mixer as claimed in any one of claims 1, 2 or 3 wherein there is at least two groups of said at least one window in said side wall, said groups being located laterally apart from one another.

11. A vertical mixer as claimed in any one of claims 1, 2 or 3 wherein said mixing chamber has a floor and a side wall, said side wall having an opening therein that includes part of said floor, said opening being sized and located to be closed by a door, said door having a closed position and an open position, said door having a segment thereon that forms part of said floor when said door is in said closed position.

* * * * *